UNITED STATES PATENT OFFICE.

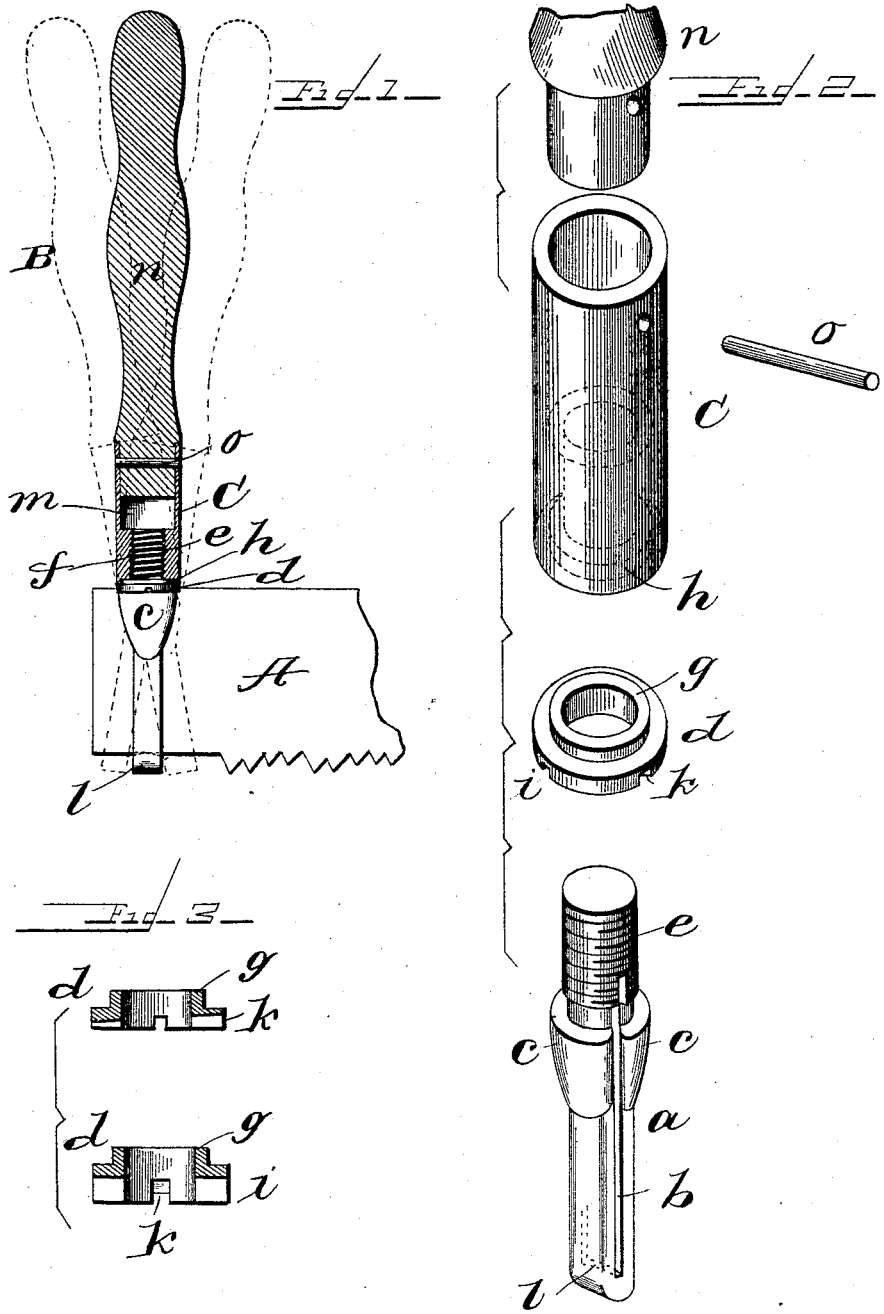

JOHN GREEN, OF RENOVO, PENNSYLVANIA, ASSIGNOR OF ONE-HALF TO EMERICK MICIANGI, OF SAME PLACE.

CROSSCUT-SAW HANDLE.

SPECIFICATION forming part of Letters Patent No. 479,361, dated July 19, 1892.

Application filed January 29, 1892. Serial No. 419,632. (No model.)

*To all whom it may concern:*

Be it known that I, JOHN GREEN, a citizen of the United States, residing at Renovo, in the county of Clinton and State of Pennsylvania, have invented certain new and useful Improvements in Crosscut-Saw Handles; and I do hereby declare the following to be a full, clear, and exact description of the invention, such as will enable others skilled in the art to which it appertains to make and use the same.

My present invention relates to handles for crosscut-saws, and has for its object certain improvements in construction, which will be fully disclosed in the following specification and claim.

In the accompanying drawings, which form part of this specification, Figure 1 represents a side elevation showing the handle in section; Fig. 2, details of the handle separated, and Fig. 3 sections through the washer.

Reference being had to the drawings and the letters thereon, A indicates a section of a crosscut-saw, and B a handle, which consists of a bolt $a$, having a slot $b$ to receive one end of a saw, is reinforced at $c\ c$ near the upper end of the slot to strengthen the bolt at the point where the greatest strain is exerted and to form a seat for the washer $d$, and the upper end of the bolt is provided with a screw-thread at $e$, which engages a nut $f$ in the lower end of the ferrule C. The washer $d$ is provided with a projection $g$ on its inner surface, which engages a recess or seat $h$ in the extreme lower end of the ferrule and outside of the nut $f$ and prevents the washer moving on the bolt, and in the outer surface of the washer are grooves $i\ k$, the former being of the same depth across the washer and the latter inclined or deeper at one edge than the other and both designed to engage the upper edge or back of the saw.

The inclined groove $k$ is used to give pitch to the handle in either direction desired, as shown in dotted lines in Fig. 1, to accommodate the sawyer, according to the position in which the saw is being worked, and to accommodate this change of position of the handle a slightly-curved seat $l$ is formed in the lower end of the bolt $a$ at the end of the slot $b$. In the ferrule C is a chamber $m$ between the bottom of the socket and the wooden handle $n$ and forms a convenient receptacle for tallow or other oily substance with which to lubricate the saw. The handle $n$ may be secured in the socket of the ferrule C by a pin $o$, and when the lubricant is desired the handle and the ferrule are unscrewed from the bolt $a$ and the oily matter removed from the chamber $m$ through the hole in the nut $f$.

It is my purpose to provide several washers $d$ of different thicknesses to take up wear of the screw-threads.

Having thus fully described my invention, what I claim is—

A saw-handle provided with a ferrule, having a receptacle for a lubricant within the ferrule and an aperture in the end of the ferrule through which to move said lubricant, in combination with a saw-supporting bolt closing said aperture.

In testimony whereof I affix my signature in presence of two witnesses.

JOHN GREEN.

Witnesses:
D. C. REINOHL,
H. B. REINOHL.